United States Patent [19]
Fortson

[11] Patent Number: 4,770,327
[45] Date of Patent: Sep. 13, 1988

[54] PORTABLE FISHING TACKLE BOX WITH OPTIONAL LURE ARRANGEMENT FEATURES

[76] Inventor: Warren D. Fortson, 320 Bay Park Dr., Brandon, Miss. 39042

[21] Appl. No.: 33,472

[22] Filed: Apr. 2, 1987

[51] Int. Cl.$^4$ ............................ A01K 97/06; B65D 1/36
[52] U.S. Cl. ............................ 224/42.01; 43/54.1; 220/22.3; 220/75; 224/202; 224/273; 224/920
[58] Field of Search ............... 43/54.1; 224/202, 257, 224/258, 42.01, 273, 920, 42.45 R, 151; 206/315.11, 349, 373; 220/22.3, 22.2, 22.1, 306, 22, 75, 83; 114/343

[56] References Cited

U.S. PATENT DOCUMENTS

| | | | |
|---|---|---|---|
| 1,827,929 | 10/1931 | Bigelow | 206/315.11 |
| 1,929,833 | 10/1933 | Van Vuren | 43/54.1 |
| 2,641,520 | 6/1953 | Moore | 43/54.1 |
| 2,723,484 | 11/1955 | Nelson, Jr. | 43/54.1 |
| 2,743,075 | 4/1956 | Johnson | 224/42.45 R |
| 2,811,276 | 10/1957 | Ray | 43/54.1 |
| 2,936,066 | 5/1960 | Meksula | 43/54.1 |
| 3,062,421 | 11/1962 | Fleming | 224/920 X |
| 3,148,811 | 9/1964 | Foltz | 43/54.1 |
| 3,181,751 | 5/1965 | Wilson | 224/920 X |
| 3,201,017 | 8/1965 | Morrissey | 206/311.11 X |
| 3,672,548 | 6/1972 | Mavrakis | 224/920 X |
| 3,775,895 | 12/1973 | Jachim | 43/54.1 |
| 3,820,679 | 6/1974 | Schweitzer | 220/22.3 |
| 3,955,705 | 5/1976 | DuBois et al. | 220/67 |
| 4,006,553 | 2/1977 | Porter et al. | 43/54.1 |
| 4,079,880 | 3/1978 | Edwards | 220/306 X |
| 4,245,422 | 1/1981 | Souza | 43/54.1 |
| 4,516,707 | 5/1985 | Crapanzano | 224/202 |
| 4,529,112 | 7/1985 | Miller | 224/202 |
| 4,604,822 | 8/1986 | Christenberry | 43/57.1 |

FOREIGN PATENT DOCUMENTS

| | | | |
|---|---|---|---|
| 643300 | 6/1962 | Canada | 43/54.1 |
| 1116133 | 1/1982 | Canada | 43/54.1 |

Primary Examiner—Henry J. Recla
Assistant Examiner—Ernest G. Cusick
Attorney, Agent, or Firm—Dewitt L. Fortenberry, Jr.

[57] ABSTRACT

A portable, vertical oriented tackle box which may be releasably mounted to a substantially vertical wall in a fishing boat. The tackle box also includes a shoulder strap so that it can be used while a fisherman is wading or surf casting. A multiplicity of interchangeable inserts for holding various fishing lures are included along with a cover capable of serving as a drop tray. This polypropylene tackle box is also resistant to warping and cracking caused by expansion and contraction resulting from temperature changes.

15 Claims, 6 Drawing Sheets

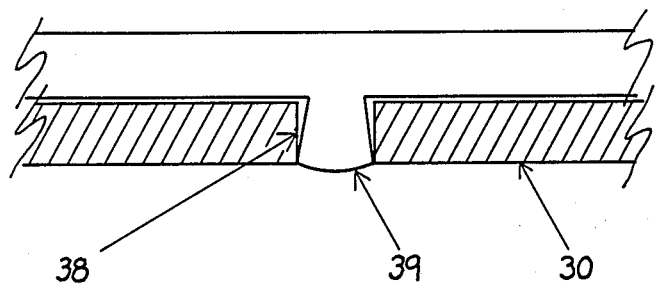
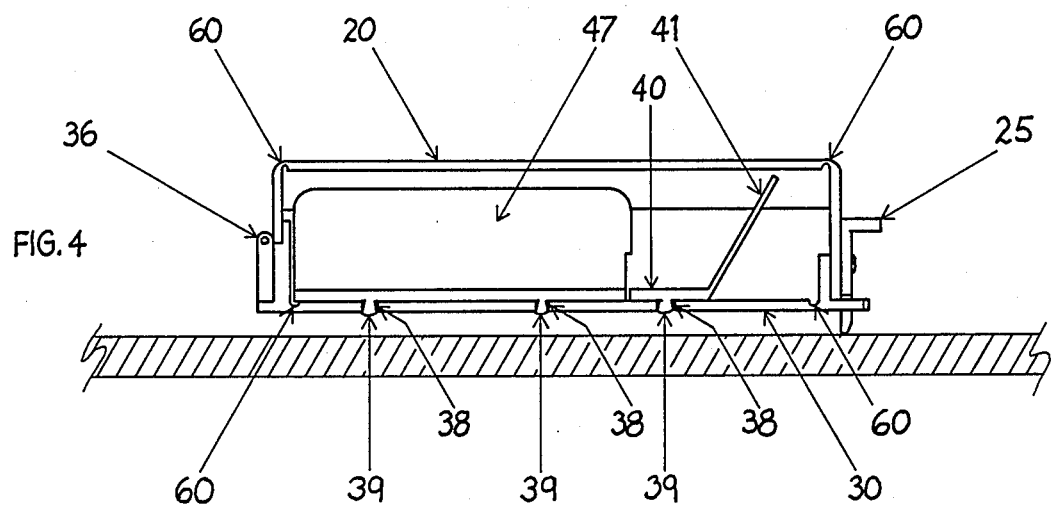
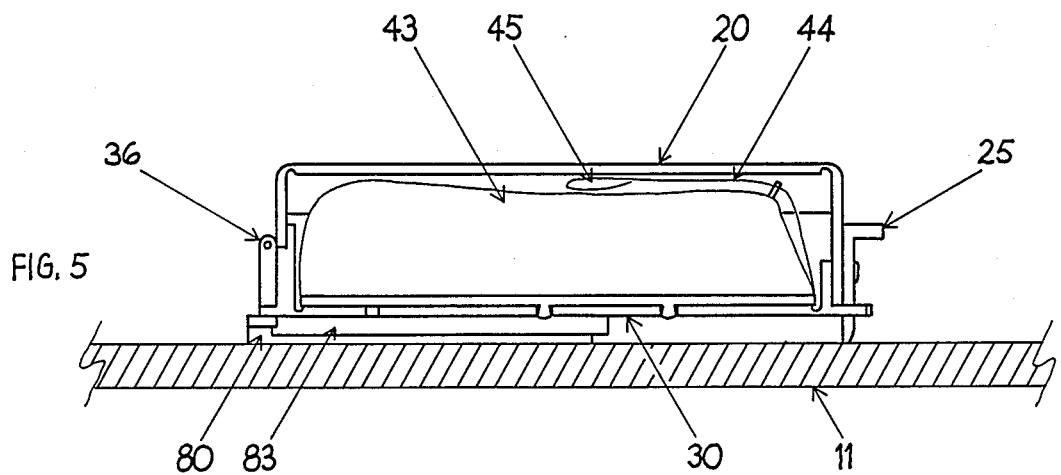

PORTABLE FISHING TACKLE BOX WITH OPTIONAL LURE ARRANGEMENT FEATURES

SUMMARY OF THE INVENTION

This invention relates to a compact, vertical oriented fishing tackle box incorporating a cover which serves as a drop tray and a multiplicity of interchangable inserts for holding various types of fishing lures. The tackle box is also versatile since it can be releasably mounted on a substantially vertical surface in a fishing boat or it can be used while wading or surf casting.

Although numerous patents have issued over the years for fishing tackle boxes, few patents have issued for a portable vertical oriented tackle box which is also convenient for use while wading or surf casting.

A primitive version of the invention described herein was disclosed in application Ser. No. 06/815,906 filed on Jan. 1, 1986, and abandoned by applicant.

The fishing tackle box claimed herein includes a body portion having a multiplicity of interchangeable inserts which are designed to hold different fishing lures. Connected to the body is a hinged cover with a plurality of latches for holding the cover in a closed position thereby protecting the fishing lures therein. When the cover is in an open position it serves as an adjustable catch-all tray. Attached to the tackle box is a combination hand/shoulder strap so that the tackle box can be used while wading or surf casting. If the fisherman desires to use the tackle box in a boat, the tackle box can be releasably secured to a substantially vertical surface in the boat. Such a vertical orientation is advantageous because the box does not take up limited floor space in a boat.

It is therefore an object of this invention to provide a portable, vertical releasably mounted tackle box for use in a fishing boat or by a fisherman while wading or surf casting.

Another object of this invention is to provide a tackle box with a convenient drop tray for holding miscellaneous fishing lures while fishing or to provide a place for lures to dry before storing them.

A further object of this invention is to provide a multiplicity of interchangeable inserts for holding different fishing lures.

Yet another object of this invention is to provide a plastic tackle box resistant to warping, cracking and shrinking caused by expansion and contraction during temperature changes.

These objects together with other objects and advantages will become apparent after a review of the details of construction and operation as more fully hereinafter described and claimed with reference being had to the accompanying drawings forming a part thereof.

A BRIEF DESCRIPTION OF THE DRAWINGS

Referring now to the drawings, wherein like referenced characters refer to like parts throughout the several views, and wherein:

FIG. 4 is an enlarged cross sectional along the section line 4—4 of FIG. 1;

FIG. 5 is an enlarged cross sectional along the section line 5—5 of FIG. 1;

FIG. 6 is a fragmentary enlarged sectional view indicating how one of the bait supporting panel portions is removably supported to the rear wall of the tackle box;

DETAILED DESCRIPTION OF THE INVENTION

Figure 1:
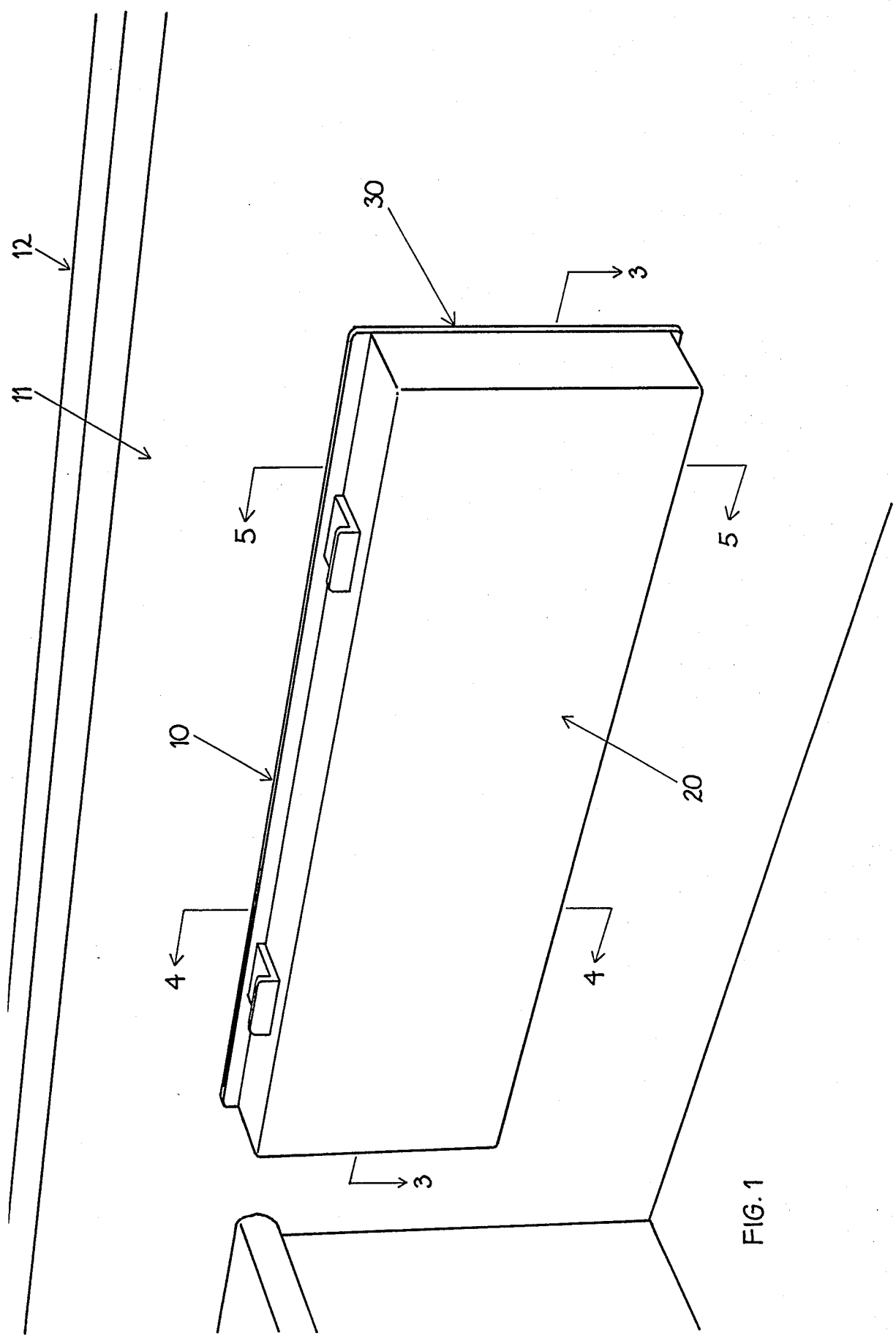
FIG. 1 is a view of the tackle box attached to an inside substantially vertical wall of a fishing boat.
Figure 2:
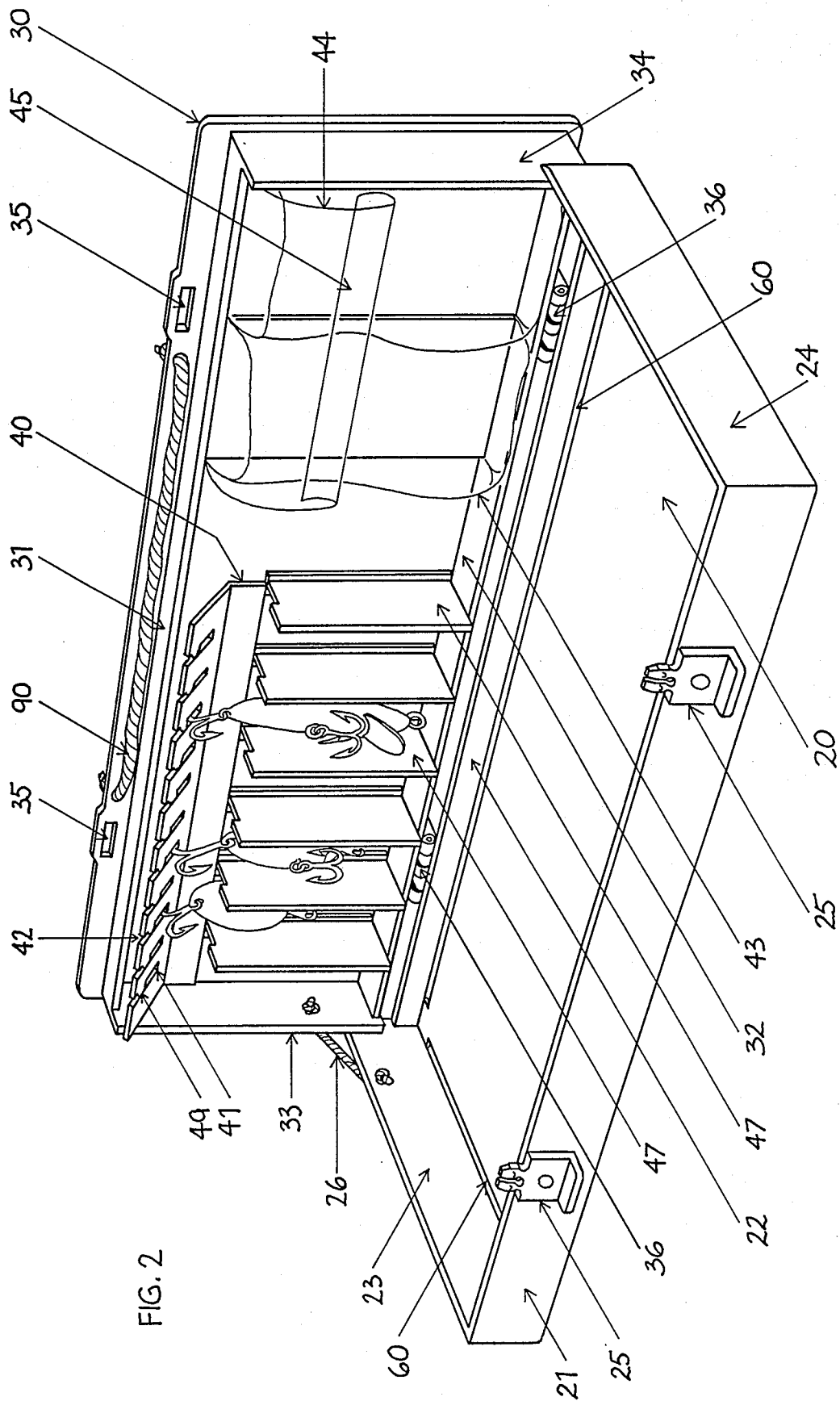
FIG. 2 is a perspective of the tackle box with the cover in an open position.

Referring now to FIG. 1, a tackle box 10 as disclosed herein is shown attached to a substantially vertical wall 11 of a fishing boat 12.

The tackle box 10 is comprised of a cover 20 having a top wall 21, a bottom wall 22, and opposite side walls 23 and 24, and a body 30 having a top wall 31, a bottom wall 32, and opposite side walls 33 and 34. The tackle box 10 is designed so that said top wall 21, bottom wall 22, and opposite side walls 23 and 24 of said cover 20 overlap said top wall 31, bottom wall 32, and opposite side walls 33 and 34 of said body 30 when the tackle box 10 is in a closed position. Said cover 20 is pivotally connected to said body 30 by a plurality of hinges 36 secured to the bottom wall 22 of said cover 20 and the bottom wall 32 of said body 30. The cover 20 is therefore capable of being pivoted from an open position to a closed position and vice versa.

The cover 20 is releasably maintained in a closed position by a plurality of latches 25 designed to frictionally engage a plurality of openings 35 inset in said body 30. When there is a need to open the cover 20 of said tackle box 10, said latches 25 can be frictionally disengaged from said openings 35. A cord 26 is attached to the side wall 23 of said cover 20 and to the side wall 33 of said body 30 and said cord 26 can be adjusted to maintain the cover 20 on a perpendicular plane with the body 30 so that said cover 20 with its top wall 21, bottom wall 22, and opposite side walls 23 and 24 serve as a catch-all tray. In this position, said cover 20 can be used to hold miscellaneous hooks and baits during the course of a fishing trip or to allow fishing lures to dry before they are placed in the tackle box 10 for storage.

In the preferred embodiment of this invention, the cover 20 and body 30 have recessed grooves 60 at the inner point of connection with their respective top walls 21 and 31, bottom walls 22 and 32, and opposite side walls 23, 24, 33, and 34. Said recessed grooves 60 may extend the entire connecting distance between said body 30 and its interconnecting top wall 31, bottom wall 32, and opposite side walls 33 and 34. The recessed grooves 60 may also extend the entire connecting distance between said cover 20 and its interconnecting top wall 21, bottom wall 22, and opposite side walls 23 and 24. Said recessed grooves 60 are necessary to prevent warping of the polypropylene constructed tackle box 10 as the result of stress caused by contraction and expansion during temperature changes.

Referring to FIGS. 3 through 6, it can be seen that said body 30 has a series of bores 38 for accepting a series of pins 39 located on the reverse side of the interchangeable bait support section. Each pin 39 is such that the diameter of the outwardly facing end is at least 0.002" greater than the diameter of the pin 39 at its juncture with the reverse side of the interchangeable bait support section. The distance each pin 39 projects away from the interchangeable bait support section is at least the depth of each board 38. By introducing said pins 39 into said bores 38 the bait support sections are releasably secured to the body 30 of the tackle box 10. The bait support sections are interchangeable and include a first section 40 having upwardly extending flanges 41 parallel with each other so as to from a multiplicity of slots 42 for holding fishing lures so that the lures will not fall out if the tackle box is turned upside down. Said first section 40 includes a series of pins 39 for insertion into a series of bores 38. Said upwardly extending flanges 41 include a half circle shaped projecting member or protrusion 49 on one side which extends into said slots 42 so as to provide a means for securing the hook portion of fishing lures. A series of vertical panels 47 are included in conjunction with said first section 40 so as to provide a means for separating lures and preventing them from becoming tangled. Another interchangeable bait support section is a plastic bag 43 having an opening, said plastic bag 43 is creased in the open position so as to allow easy access for the insertion of fishing lures. Said plastic bag 43 is attached to a panel member 46 having pins 39 on its reverse side to be engaged in said bores 38 so as to releasably secure said plastic bag 43 to the body 30 of the tackle box 10. In conjunction with said plstic bag 43 is a flap member 44 having a weighted member 45 to maintain the flap member 44 below the opening of said plastic bag 43 so that fishing lures are retained in said plastic bag 43. Flap member 44 also prevents rain or water such as boat spray from entering the plastic bag 43.

Figure 3:
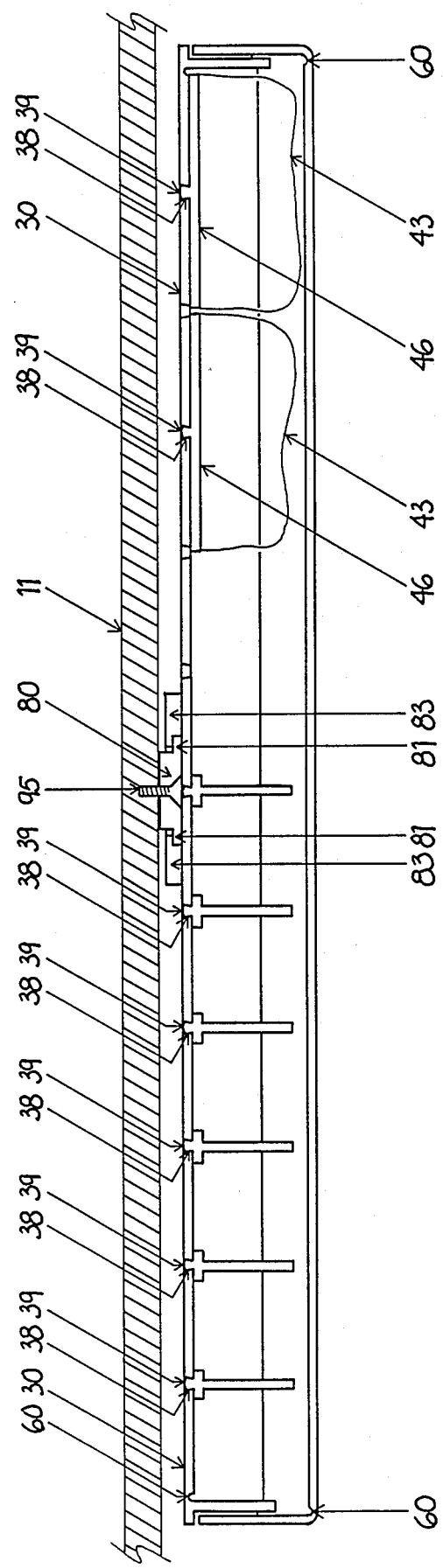
FIG. 3 is an enlarged cross sectional along the section line 3—3 of FIG. 1.

Another feature of the invention is a means for releasable mounting the tackle box 10 to a substantially vertical wall 11 of a fishing boat 12. Said releasably mounting means consists of a mounting pad 80 which is secured to the substantially vertical wall 11 of a fishing boat 12 by at least one screw 95 or other suitable means. Said mounting pad 80 includes two outwardly extending wing members 81 which are removed from and substantially parallel to the surface of the substantially vertical wall 11 so as to form a plurality of slots between said wing members 81 and said vertical wall 11. a plurality of L-shaped members 83 are secured to the backside of the body 30 so as to form a slot between said L-shaped members 83 and parallel to the back side of said body 30. With reference to FIG. 3, the L-shaped members 83 are secured to the back side of the body 30 in a position so that the wing members 81 can be partially inserted into the slot between said L-shaped members 83 and the back side of said body 30. By inserting said wing member 81 of said mounting pad 80 into the slot formed by the L-shaped members 83, the tackle box 10 may be releasably secured to a substantially vertical wall 11 of a fishing boat 12.

Figure 7:
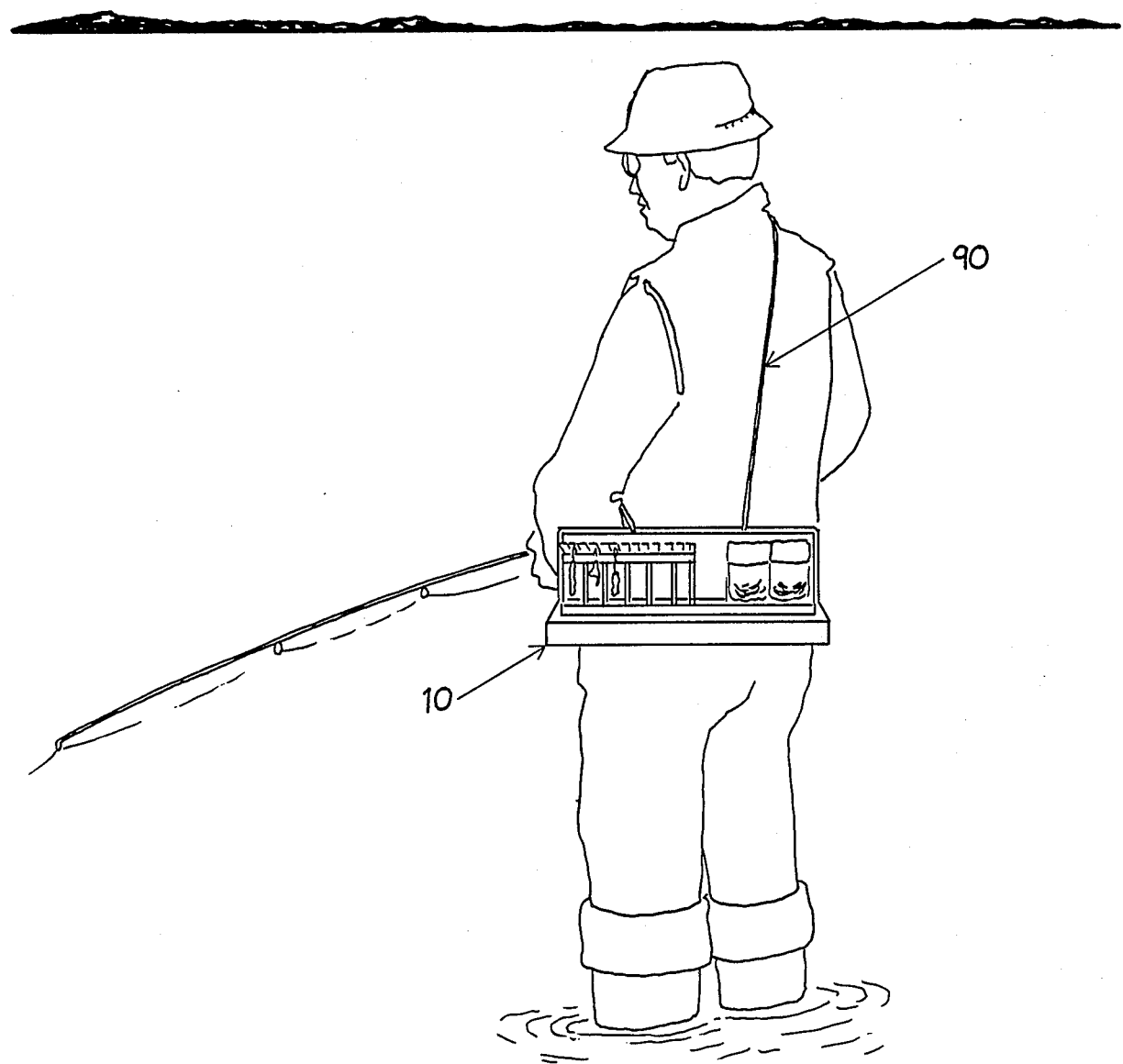
FIG. 7 is an illustration of the tackle box being used while wading or surf fishing.
Figure 8:
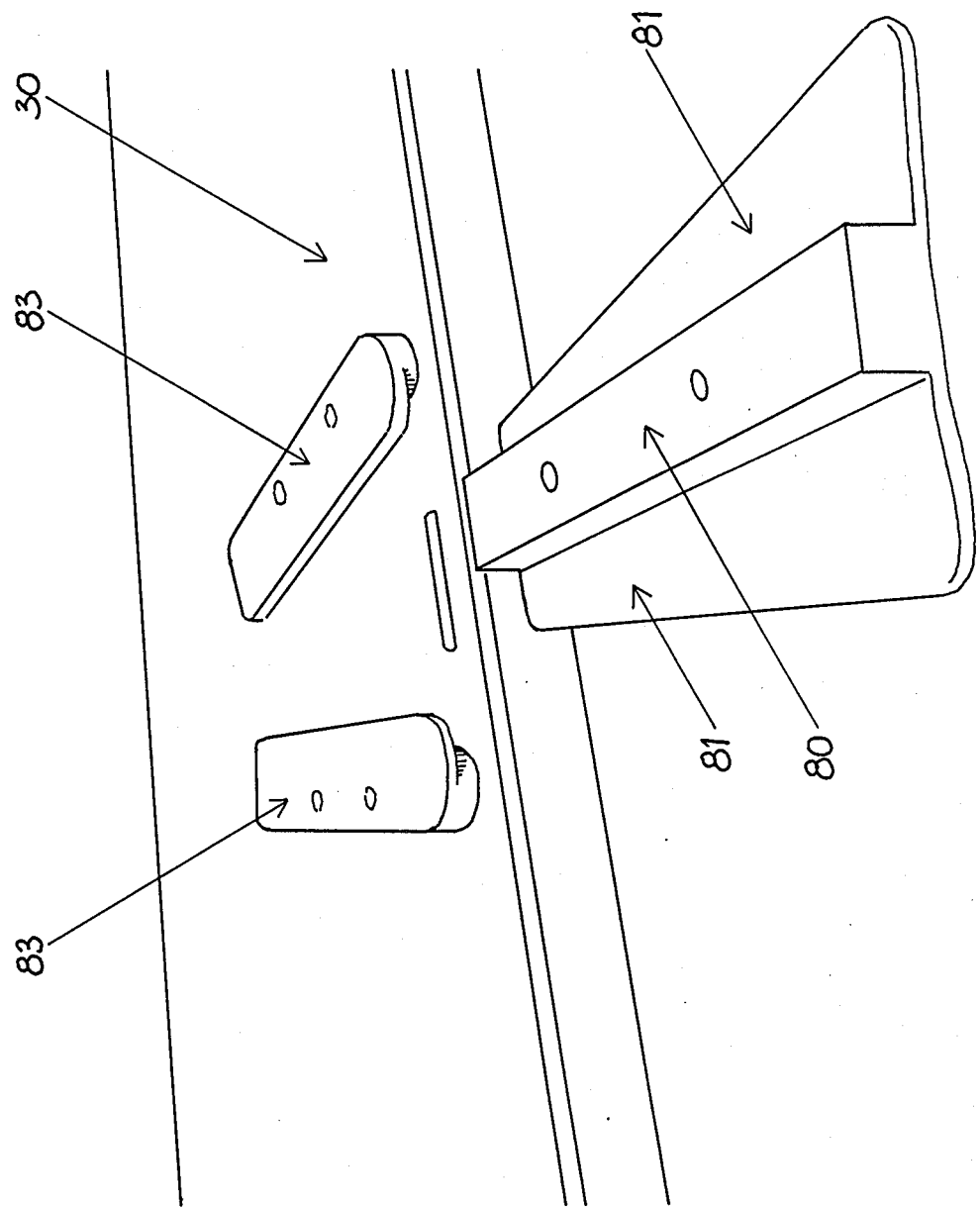
FIG. 8 is a view of the means for releasably mounting the tackle box to a substantially vertical surface.

Referring now to FIG. 7, if a fisherman is wading or surf casting instead of fishing from a boat, the versatility of the invention becomes evident whereby the fisherman can use a shoulder strap 90 attached to the top edge of the body 30. The invention provides the fisherman with easy access to his lures when away from shore or a boat while wading or surf casting.

Although particular components have been discussed with the specific embodiment of the invention, other components may be utilized in accordance with the teachings of the present invention. Furthermore, it is understood that although an exemplary embodiment of the invention has been disclosed, other applications and mechanical arrangements are possible and the embodiment disclosed may be subjected to various changes, modifications, and substitutes without departing from the spirit of the invention.

What is claimed is:

1. A portable front opening tackle box having a means for releasably mounting on a substantially vertical surface, said tackle box including a body having an inner facing point of connection with forwardly extending interconnecting top, bottom and opposite side walls with recessed grooves at the inner facing point of connection between said body and said body's interconnecting top, bottom and opposite side walls, a cover having an inner facing point of connection with rearwardly extending and interconnecting top, bottom and opposite side walls with recessed grooves at the inner facing point of connection between said cover and said cover's interconnecting top, bottom and opposite side walls, a means for pivotally connecting the bottom wall of said cover and the bottom wall of said body, a latch means for releasably maintaining said cover in a closed position, and a multiplicity of interchangeable bait supporting sections attached to said body between said body's interconnecting top, bottom, and opposite side walls whereby said interchangeable bait supporting sections are interchangeably mountable at different locations on said body.

2. The tackle box of claim 1 wherein one of said bait supporting sections includes a multiplicity of flanges forming a multiplicity of slots for holding fishing lures.

3. The tackle box of claim 2 wherein said flanges include a projecting member extending into said slots.

4. The tackle box of claim 3 wherein one of said bait supporting sections includes a rear support panel having a plastic bag with an opening supported therein for receiving lures.

5. The tackle box of claim 4 wherein said rear supporting panel includes a weighted plastic flap for extending over the opening of said plastic bag.

6. The tackle box of claim 1 wherein each said bait supporting section has multiple projecting pins and the body has multiple bores holes corresponding to said projecting pins so that said pins may be frictionally inserted in said bores so as to provide means for releasably securing said bait supporting sections to said body.

7. The tackle box of claim 6 wherein said pins have an outermost diameter greater than the diameter of said pins where said pins project from said bait supporting section.

8. The tackle box of 7 wherein the length of said pins is at least the depth of said bores.

9. The tackle box of claim 1 wherein one of said bait supporting sections includes vertical panels.

10. The tackle box of claim 9 wherein one of said bait supporting sections includes a multiplicity of flanges forming a multiplicity of slots for holding fishing lures.

11. The tackle box of claim 10 wherein said flanges include a projecting member extending into said slots.

12. The tackle box of claim 1 wherein one of said bait supporting sections includes a rear support panel having a plastic bag with an opening supported therein for receiving lures.

13. The tackle box of claim 12 wherein said rear support panel includes a weighted plastic flap for extending over the opening of said plastic bag.

14. The tackle box of claim 1 wherein said recessed grooves of said body do not extend the entire inner facing point of connection between said body and said body's interconnecting top, bottom and opposite side walls and said recessed grooves of said cover do not extend the entire inner facing point of connection between said cover and said cover's interconnecting top, bottom, and opposite walls.

15. A portable front opening tackle box having

A means for releasably mounting said tackle box to a substantially vertical surface;

A body having an inner facing point of connection with forwardly extending interconnecting top, bottom, and opposite side walls with recessed grooves at the inner facing point of connection between said body and said body's interconnecting top, bottom, and opposite side walls, said body having a multiplicity of bore holes;

A cover having an inner facing point of connection with rearwardly extending and interconnecting top, bottom, and opposite side walls with recessed grooves at the inner facing point of connection between said cover and said cover's interconnecting top, bottom, and opposite side walls;

A means for pivotally connecting the bottom wall of said cover and the bottom wall of said body;

A latch means for releasably maintaining said cover in a closed position; and

A multiplicity of interchangable bait support sections having pins projecting therefrom so that said pins may be frictionally inserted in said bore holes so as to provide a means for releasably securing said bait support sections to said body, and said interchangable bait support sections being comprised of a combination of flanges forming a multiplicity of slots for holding fishing lures, said flanges having a projecting member extending into said slots; a rear support panel having a plastic bag with an opening supported therein for receiving lures, said rear support panel having a weighted plastic flap for extending over the opening of said plastic bag; and a multiplicity of vertical panels for separating fishing lures.

* * * * *